United States Patent
Ow et al.

(10) Patent No.: US 10,362,196 B2
(45) Date of Patent: Jul. 23, 2019

(54) SECURED COMMUNICATION DISTRIBUTION SYSTEM AND METHOD

(71) Applicants: Duvon Corporation, Las Vegas, NV (US); Benedict Ow, Las Vegas, NV (US)

(72) Inventors: Benedict Ow, Las Vegas, NV (US); Andrew Platter, Las Vegas, NV (US); Dmitry Kogosov, Las Vegas, NV (US); Richard Stiles, Las Vegas, NV (US)

(73) Assignee: Duvon Corporation, Las Vegas, NV (US)

( * ) Notice: Subject to any disclaimer, the term of this patent is extended or adjusted under 35 U.S.C. 154(b) by 152 days.

(21) Appl. No.: 15/145,795

(22) Filed: May 3, 2016

(65) Prior Publication Data

US 2016/0248936 A1 Aug. 25, 2016

Related U.S. Application Data

(63) Continuation-in-part of application No. 14/693,860, filed on Apr. 22, 2015, now Pat. No. 9,363,563, which is a continuation of application No. 13/865,908, filed on Apr. 18, 2013, now Pat. No. 9,027,050.
(Continued)

(51) Int. Cl.
| | |
|---|---|
| *H04L 9/32* | (2006.01) |
| *H04N 1/44* | (2006.01) |
| *H04L 12/58* | (2006.01) |
| *H04L 29/06* | (2006.01) |
| *H04N 21/254* | (2011.01) |
| *H04N 21/4627* | (2011.01) |
| *H04N 21/40* | (2011.01) |
| *H04N 21/433* | (2011.01) |
| *H04N 21/436* | (2011.01) |

(52) U.S. Cl.
CPC .......... *H04N 1/4486* (2013.01); *H04L 51/04* (2013.01); *H04L 63/0428* (2013.01); *H04N 1/444* (2013.01); *H04N 21/2541* (2013.01); *H04N 21/40* (2013.01); *H04N 21/4334* (2013.01); *H04N 21/43615* (2013.01); *H04N 21/4627* (2013.01)

(58) Field of Classification Search
CPC .... H04N 1/4486; H04L 63/0428; H04L 51/04
USPC ........................................................ 713/168
See application file for complete search history.

(56) References Cited

U.S. PATENT DOCUMENTS

| | | | | |
|---|---|---|---|---|
| 7,562,302 B1* | 7/2009 | Barrus | ................. | G06F 3/0481 715/730 |
| 2004/0024828 A1* | 2/2004 | Miyagi | ............. | G06F 17/30899 709/206 |

(Continued)

*Primary Examiner* — Anthony D Brown
*Assistant Examiner* — Samuel Ambaye
(74) *Attorney, Agent, or Firm* — Lightbulb IP, LLC

(57) ABSTRACT

A media distribution system provides controlled distribution of media owned by various parties hosted on a local media access device. A media image communication system provides a secure method of communications between the media host and the client receiving and viewing the media. The media image communication system converts a typical text message into an image file format to prevent unauthorized access to the message, and to prevent any changes and/or manipulation of the message content.

16 Claims, 7 Drawing Sheets

Related U.S. Application Data

(60) Provisional application No. 61/749,305, filed on Jan. 5, 2013.

(56) References Cited

U.S. PATENT DOCUMENTS

| 2009/0217332 A1* | 8/2009 | Hindle | H04N 5/782 |
| | | | 725/109 |
| 2013/0276013 A1* | 10/2013 | Li | H04N 21/84 |
| | | | 725/20 |

* cited by examiner

SECURED COMMUNICATION DISTRIBUTION SYSTEM AND METHOD

CROSS-REFERENCE TO RELATED APPLICATION

This application is a continuation-in-part of U.S. patent application Ser. No. 14/693,860, filed Apr. 22, 2015, which is a continuation of U.S. patent application Ser. No. 13/865,908, filed Apr. 18, 2013, now U.S. Pat. No. 9,027,050, which claims priority to U.S. Provisional Patent Application No. 61/749,305, filed Jan. 5, 2013.

BACKGROUND OF THE INVENTION

Field of the Invention

The invention relates to distribution and storage of digital media, and in particular to a secured file distribution system and method therefor.

Related Art

The devices, features, and functions described herein are intended to address the movie and media delivery marketplace. There are currently a number of movie and media delivery systems available that provide users the capability to stream movies online to their TVs, PCs, and portable smart devices.

From the discussion that follows, it will become apparent that the present invention addresses the deficiencies associated with the prior art while providing numerous additional advantages and benefits not contemplated or possible with prior art constructions.

SUMMARY OF THE INVENTION

The Secured Media Distribution System (SMDS) herein provides a method for communicating between the media provider and the client/user of the digital media. The Media Image Communications System (MICS) is designed to accept a communications input from a user and convert the content of the communication to an image file format. The purpose of the communications conversion is to prevent unauthorized persons from accessing, altering, editing or otherwise tampering with the communications information.

In one preferred embodiment of the MICS, a user may engage the MICS to send a message to the provider hosting the Secured Media Distribution System. The user will enter the text message using a smart device such as a smartphone, personal computer or other input device. The MICS will capture the text and convert the text to an image file, preventing the content from being altered. Once converted, the MICS will send a notification to the SMDS host as an indication that a message from the user is waiting. The SMDS host will acknowledge the notification and the MICS will make the message file available to the SMDS host. The MICS will convert the image file at the host location back to its original form (in this case, text). Should the SMDS host choose to respond to the message, the process of converting the text to an image file would proceed for the SMDS host message being sent to the user.

MICS communications within the SMDS provides for management of the message based on how the owner/creator of the message chooses to share their message. In one embodiment, a message generated by the host of the SMDS may send a message to a recipient using the MICS. The host may choose to permit the recipient to take possession of the received message and move it to a client-owned and managed partition of the SMDS storage. Likewise, the host of the SMDS may choose to deny permission of the recipient to take possession of the received message, making the message read only. This condition will prevent the recipient from taking possession of the message and will not allow the recipient to download or otherwise move the message from the provider managed partition to the client managed partition of the SMDS system.

In a similar manner, the client of the SMDS may utilize the MICS to generate a message to the service provider. The client generating the message may choose how the service provider receives and otherwise manages the message being received. The client generating the message may choose to allow the service provider (hosting the SMDS) to download and otherwise take ownership of the message, or the client may choose to limit the service provider engagement with the message as read only.

The MICS allows the creator of the message to choose how the recipient will engage with and otherwise receive the content of the message. The MICS allows a message to be generated and otherwise completely controlled by any party utilizing the SMDS, regardless of their relationship as a host for media distribution, or a client of the media distribution service.

While the MICS is designed as a communications vehicle for use within the Secured Media Distribution System, it can be used as a stand-alone communications method to support consumer and enterprise communications in instances where added security is required.

As will become apparent from the disclosure herein the MICS may have a variety of configurations. The MICS may be deployed as a stand-alone communications system, or it may be deployed as part of a broader system, as is the case with the Secured Media Distribution System.

In one exemplary embodiment, the MICS may be distributed through an online app store such as GOOGLE PLAY or ITUNES to be used in a consumer environment, and may be installed on multiple smart-type and/or computing devices for the purpose of hosting secured communications between one or more users. The MICS may be used to communicate messages between one or more users to one or more recipients.

The MICS provides a secure method of communications between parties, preventing unauthorized access and/or manipulation of the message being shared.

The MICS may be deployed as part of a business or enterprise computing system where communications between one or more workstations and/or users is required. The system can facilitate communications for an unlimited number of participants, depending on the need of the given environment.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
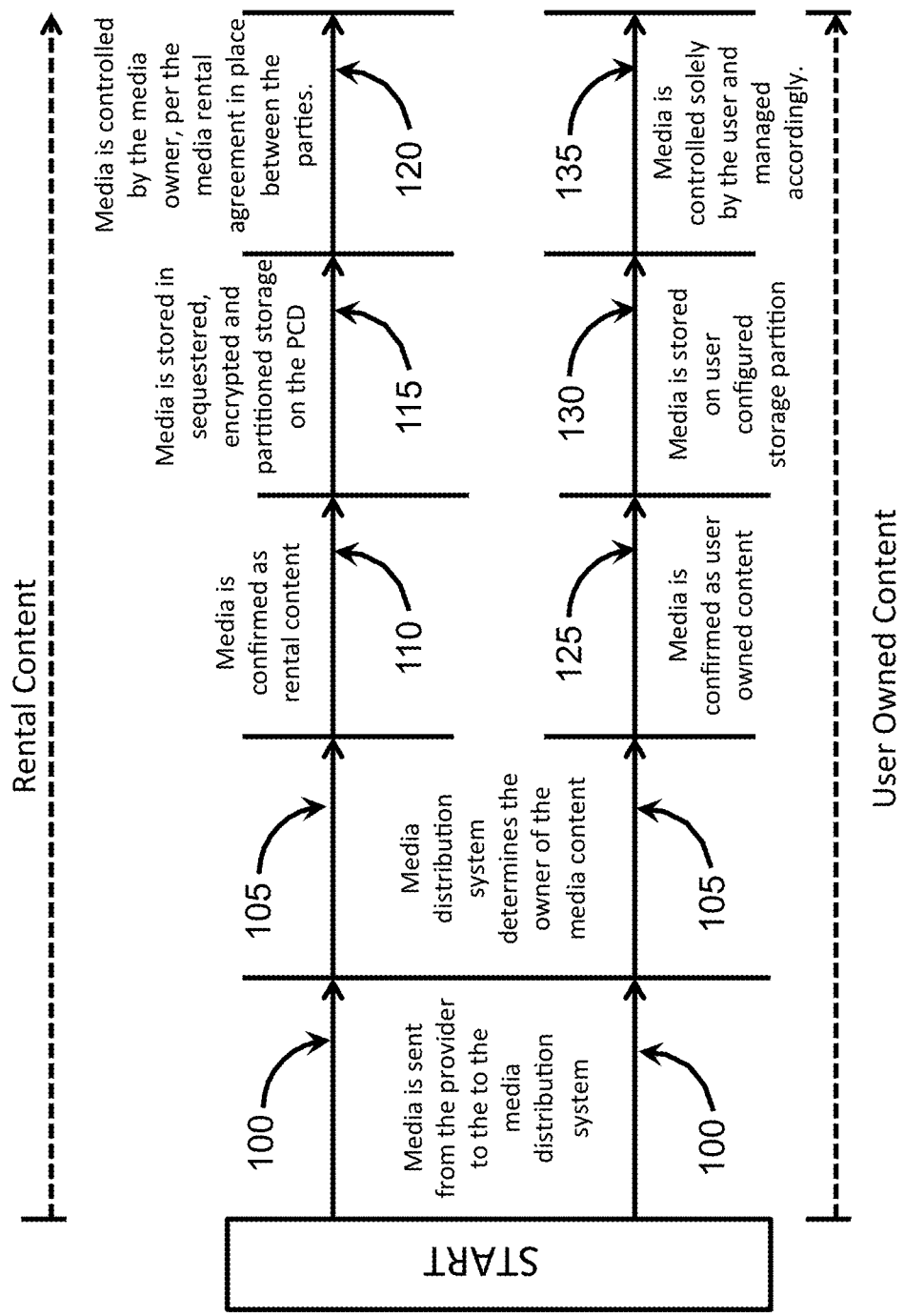
FIG. 1 is a flow diagram illustrating handling of media, including rights and ownership, via an exemplary media distribution system.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The media distribution system herein is generally configured to allow consumer access to digital media in a secure and/or controlled fashion via a local media access device. The media distribution system provides a digital media rental system, which allows a digital media provider to remotely connect to an end-user media access device to load the digital media content for a user. As used herein, media includes, but is not limited to, movies, music, videos, eBooks, digital news, concerts, sporting media, special event media, etc.

Media can be directly downloaded to the media access device at a predetermined time chosen by the user (subscription model). This allows users with lower bandwidth to take advantage of digital media services. Media can be chosen from an "app" that is loaded on any PC, laptop, portable smart device, tablet, smart phone, or other digital device that accesses the internet. The media distribution system may provide an application programming interface (API) to allow the user to access the content to be leased, rented, and/or purchased.

In addition, the media distribution system includes systems and methods for allowing media that is owned by the user of a media access device to be co-located (on the same device) as media that is owned by third parties. Security features of the media distribution system protect the interests of each party, prohibiting the other from accessing, copying, downloading, viewing, or otherwise connecting to the media without permissions being granted by the media's owner.

The digital media rental system allows a user to interact with one or more media providers to receive digital media (movies, music, eBooks, and other digital content). While other known devices provide a conduit to receive media in a similar fashion, the media access device herein differs significantly as will now be described.

In a typical movie or video rental scenario, a user will access a media provider from their internet ready TV or other portable internet device and browse the content offered by the provider. Once the content is chosen and purchased or rented, the content is made accessible for viewing and is streamed from the provider through the internet to the user's device. Streaming, commonly seen in the forms of audio and video streaming online (as used herein), refers to playing a media file without completely downloading the file first. The media may be buffered on a playback device while it is playing and downloading.

Once the media session is complete, the transaction ends. The media access device herein provides the capability of downloading multiple digital media files simultaneously, storing them for access at the user's convenience. In a similar manner to a movie rental model, the user can go to the online video store, choose multiple titles for viewing and have these titles delivered to the media access device. The rented or other purchased content is stored locally on the media access device for later use.

Traditionally leased or rented media is typically stored in cloud based or other online storage, but the media access device eliminates the need to store media remotely. A secondary function of the media access device is to allow temporary storage and management of media that is being leased or rented from a media provider (like Netflix™ or Blockbuster™). As will be described further below, the media access device provides separate and secure storage for rental media to ensure media security.

The media loaded to the media access device will typically be chosen from a media provider and be managed by a corresponding service agreement. A typical media provider service agreement allows users to pay a flat rate for a specific number of digital media rentals within a given period. As an example, we will assume 10 media rentals in a 30-day period. The user entering into the agreement will access the provider website and create a media list from which the provider will begin providing media directly to the user via the media access device as defined by this list. The user can manage their content list remotely from any of their internet ready devices. In this manner, media can be managed locally as well as remotely.

A key feature of the media access device lies in allowing the user to determine a time for the media to be delivered from the media provider to the media access device. This feature significantly improves user bandwidth optimization, and is particularly well suited for users with lower speed connections, which make streaming difficult, if not impossible. The user of the device can choose any time during the day or night for the delivery of the media to the device, allowing them to obtain it immediately or schedule the delivery of the media during non-peak usage hours, negating the need for higher bandwidth to enjoy the digital content.

Media rental or lease will now be described. It is noted that the user would create an account and/or login to a media provider website. Once at the media site, they create a list of media the user wishes to view for the given period (in this case, 30 days). Once the user has executed and completed the media agreements called for by the provider, they would choose a time of day in which the media would be delivered to their media access device.

Media rental or lease will now be described. It is noted that the user would create an account and/or login to a media provider website. Once at the media site, they create a list of media the user wishes to view for the given period (in this case, 30 days). Once the user has executed and completed the media agreements called for by the provider, they would choose a time of day in which the media would be delivered to their media access device.

At the predetermined time, the media provider would automatically access the media access device and begin downloading the media selections from the list created by the user. For this example, we will assume that the provider has agreed to allow the user to host or store three rental titles locally on their media access device at any given time.

The media would be loaded into the device in the sequestered and encrypted storage area of the media access device, limiting the user's options to those granted by the provider. These options would typically include, but are not limited to, play, rewind, pause, start, stop, fast forward, purchase, and delete. It is noted that the media access device may utilize various storage technologies now known or later developed, including magnetic, optical, or flash based storage.

The media would remain on the media access device for the time allotted, such as defined by the agreement entered into by the user and the media owner. Once the user has accessed and viewed the media, and indicated it should be deleted, it will be subsequently removed from the device, and be replaced by the next media selection from the user's list created and hosted on the provider site. The media access device will always host the minimum number of media titles (in this case three) giving the user a variety of choices, as opposed to the typical single movie streaming model. It will be understood that minimum numbers of media titles may be hosted on the media access device.

At any time within the media hosting arrangement, the user can choose to purchase a title from the media owner. Once the purchase has been completed, the media will be immediately removed from the sequestered storage portion of the device and relocated to a personal cloud portion of the device. This personal cloud portion is a media repository where the user keeps their personal digital content (i.e., the media the user owns), which may be managed through a media distribution system. Exemplary media distribution systems include StoAmigo™ (a cloud-based file management and storage system from Duvon Corporation), Dropbox™ Box™ SugarSync™, Google Drive™ and iCloud™.

Though described herein with regard to movies or television shows, it is noted that the media access device may handle music, eBooks, and other digital media that can be rented or purchased from digital media providers in the same fashion.

Another advantage of the media distribution system is that it provides security for the rented or leased media. As described briefly above, in operation the security feature may store digital content delivered to the device from a provider in a sequestered storage area on a media access device that is controlled and managed (at least partially) by the provider. This allows the provider to execute permissions or conditions for use or access that may be associated with the media. In this manner, the provider has complete control and ownership of the media, even while the media is being hosted on the user's media access device.

The media will typically be encrypted to ensure that the user cannot accidentally or otherwise access the media without express permission. A media owner can therefore choose at any time to remotely delete and/or otherwise block usage of the media as well. This is because the permission setting on the media being shared is based on the recipient of the share, as opposed to the media itself. With this permission based sharing, media can be managed without the need for passwords and other antiquated protection methods. Permissions are always controlled by the owner of the media, and can be changed and/or revoked at any time. This gives the media owner ultimate control over their media. Media can be taken back at any time, regardless of the content of the share, the user the share is tied to, or the media being shared.

In addition to the encryption methodology for protection of the media, the media access device also incorporates a multiple-partition approach on its storage device designed to prevent access to the media that is owned, managed, and controlled by the media provider. Having rented media stored on a separate partition within the storage device of the media access device adds a second layer of security, ensuring the media remains the sole property of the media owner.

A typical scenario for media storage and access within the device will now be described with reference to the flow diagram of FIG. 1. At a step 100, rental media is sent from a media provider to the media access device. At a step 105, the media access device recognizes the content as leased or rented material, such as via an API, code identification, or other identification scheme provided by the media provider. If the media has been leased or rented, the identification process notifies the media access device that the material is not the property of the media access device's user at a step 110.

At a step 115, the media access device then routes the media to a secure partition or portion of the media access device's storage device for storage and access by the user. The media owner (in this case the media provider) maintains full rights of access, including removal and deletion of the media from the device and may control or change usage, access, or other rights/capabilities at a step 120. It is noted that while the media access device is storing the media for the user to access, it may also be encrypted to ensure that there is no way for the user to accidentally or otherwise gain access to the media without the express consent of the media owner.

As stated above, once the user is done with the media, it can either be purchased or removed from the media access device, thereby allowing the media provider to download another media selection from the user's list to the media access device, at the predetermined time defined by the user.

Referring to step 125, if the media is confirmed as user owned content, the media may be stored in a user partition on the media access device's storage device at a step 130. The user may then control or change usage, access, or other rights/capabilities to this user owned media at a step 135. It is understood that the storage can be (but is not limited to) a physical drive with dual (dedicated) partitions, one for the user and one for the provider, or completely separate physical drives.

Figure 2A:
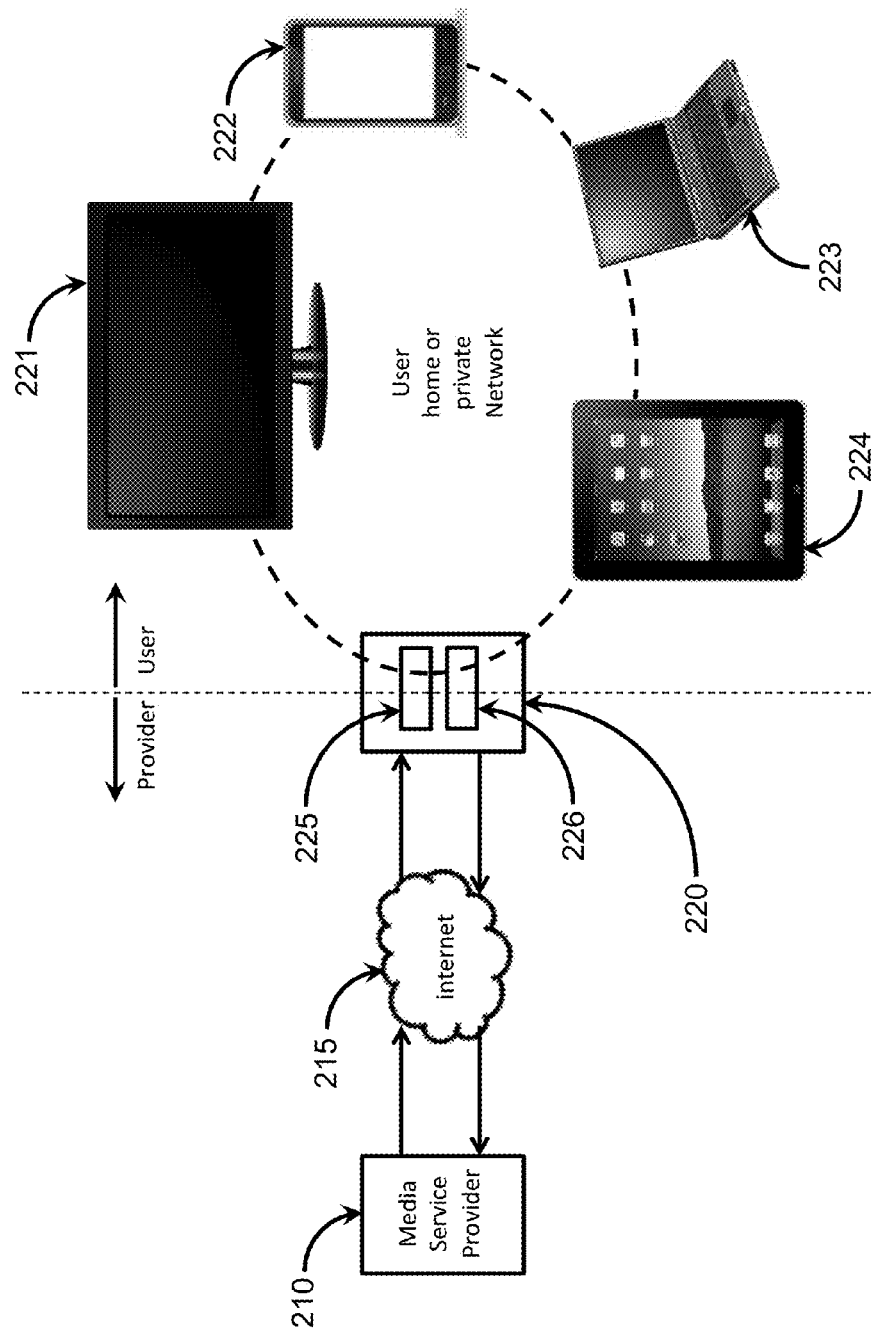
FIG. 2A is a block diagram illustrating an exemplary media distribution system and environment of use.

FIG. 2A is a block diagram illustrating an exemplary media distribution system 200. As can be seen, the media distribution system 200 may include one or more media access devices 220 connected to one or more media providers 210 via a network, such as the Internet 215. In one or more embodiments, the media access device 220 may be a network appliance or set top box type of device configured to operate as disclosed herein. Typically, the media access device 220 will include one or more wired or wireless communication devices to allow communication with a media provider 210 or other user devices (as will be described further below).

As can also be seen, the media access device 220 will typically be located at a user's premises, such as the user's home. The media provider 210, which may be a server or the like, may be remote from the media access device 220 and be in communication with the media access device 220 via the Internet 215 or other network.

The user may access (e.g., play) media hosted/stored on the media access device 220 from various client devices. As shown in FIG. 2A for example, the user may view or be presented media on the media access device 220 from a television 221, smartphone 222, laptop or other computer 223, or tablet 224. Typically, these devices will be on the same local network as the media access device 220. It is also noted that users incorporating devices like smartphone 222, laptop or other computers 223, and tablets 224 can access their media distribution system remotely (outside of their local area network (LAN) through a cloud service like StoAmigo. The user can access their cloud service from any available internet connection.

As described above, the user may host or store various media on the media access device 220. For security purposes, this media may be stored in various portions or partitions on a storage device of the media access device 220. As shown in FIG. 2A for example, a provider managed partition 225 and a user managed partition 226 are provided. The media provider 210 controls the provider managed partition 225 to retain control and ownership of its media even though the media access device is in the user's possession. Typically, rented or leased media will be stored in the provider managed partition 225, as described above. Similarly, the user controls the user managed partition 226, thereby allowing the user to control use or access of his or her media.

Figure 2B:
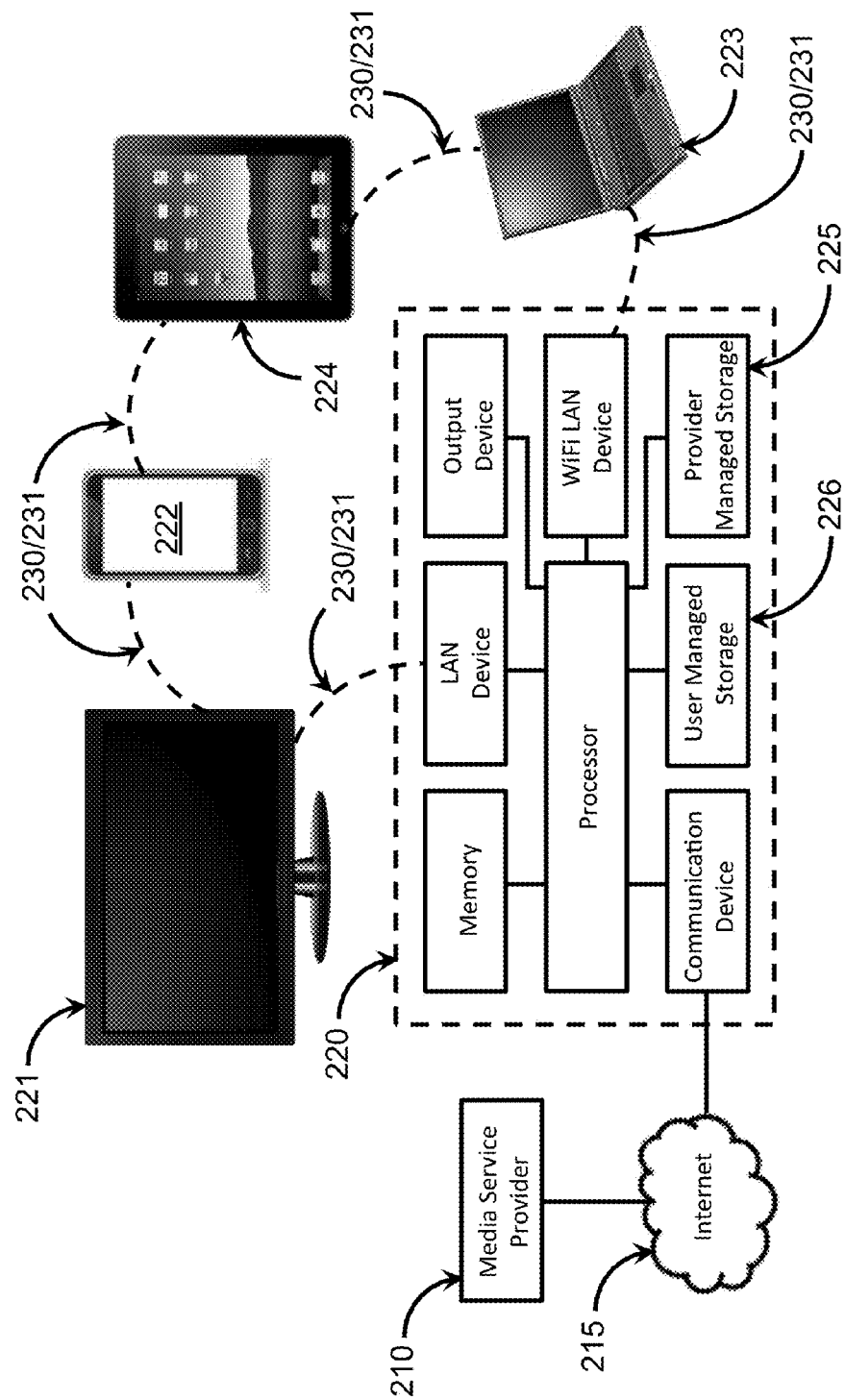
FIG. 2B is a block diagram illustrating an exemplary media distribution system and components thereof in an exemplary environment of use.

FIG. 2B is a detailed view of the media access device 220 in an exemplary environment of use. As can be seen, the user gains access to both the provider managed storage 225 and the user managed storage 226 from their local area wired 230 or wireless 231 local area network (LAN). As disclosed herein, the user can easily access and view the media hosted on either storage device within the media access device 220 from their TV 221, smartphone 222, laptop or desktop computer 223, and/or their tablet 224.

FIG. 2B also illustrates components of an exemplary media access device 220. As can be seen, the media access device 220 may comprise one or more processors communication devices, storage devices, and memory devices. One or more output devices, such as for outputting media to one or more client devices may optionally be provided. In general, an output device will directly provide an audio and/or video signal to a client device, such as a television 221, to present media thereon.

In general, a processor may be a microprocessor, controller, circuit or the like. In one or more embodiments, a process will be configured to control components of the media access device 220 to provide the functionality described herein. To illustrate, the instructions may be configured to segregate provider media and user media when stored and control access to the same as described herein. A processor may execute one or more instructions such as machine readable code to provide such functionality. It is contemplated that these instructions may be stored on a memory or storage device or may be hardwired into a processor. In some embodiments, the instructions may be stored on and retrieved from a non-transitory storage medium for execution by a processor.

A storage device may utilize various data storage technologies for reliably storing data thereon. For example, a storage device may be a magnetic hard drive, flash drive, or optical drive in one or more embodiments. Typically, the provider managed storage 225 and user managed storage 226 will be separate storage areas. It is contemplated that the provider managed storage 225 and user managed storage 226 may be separate storage areas or partitions on a single physical storage device or multiple storage devices.

Various communications devices may be provided as well. For instance, in the embodiment of FIG. 2B, the media access device 220 has a first communication device for communicating with a media provider 210 via a wide area network, namely the internet 215. The media access device 220 may also comprise one or more second communication devices for communicating via a local area network. In FIG. 2B for instance, the media access device 220 comprises a wireless LAN communication device as well as a wired LAN communication device. It is noted that one or the other or both may be provided in some embodiments.

In general, the second communications devices transmit media to one or more client devices on a local area network where the media may be presented/viewed by a user. To illustrate, it is contemplated that the local area network may be a local subnet at the user's location, such as the user's residence, office or the like. The first communication device may be used to receive media, such as rented or purchased media from a media provider 210, from a remote location via the internet 215 or other wide area network.

Figure 2C:
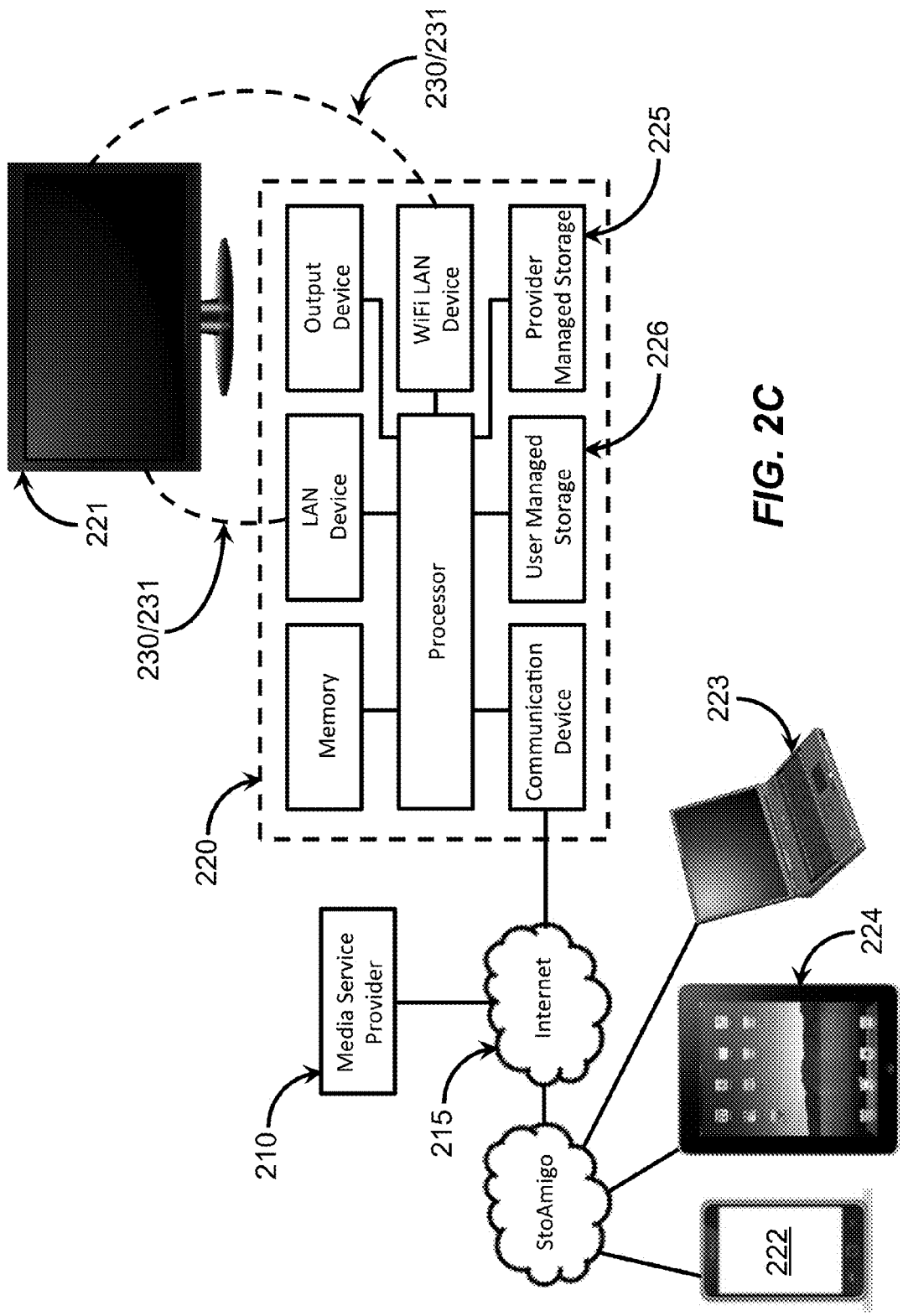
FIG. 2C is a block diagram illustrating an exemplary media distribution system and components thereof in an exemplary environment of use.

FIG. 2C illustrates how the user can access the provider managed content 225 as well as their own content 226 from any physical location that has an internet connection. The user can achieve this by first logging into their cloud storage provider (such as StoAmigo). The ownership of the media access device is then authenticated by the cloud storage system and remote access to the user device is granted. The user can now view, manage, and otherwise gain full access to the personal storage 226. The provider managed storage 225 will be governed by the terms of the user agreement in place between the media host and the user, but if the agreement allows remote access, the user will be able to view their rental content from anywhere they have internet access. This capability allows the user to freely view their media from home or on the road, providing ultimate accessibility to rented content.

The MICS described herein is generally configured to enable communications between the host of the Secured Media Distribution System and the user utilizing the system. It is important to note that while the MICS in the following example is being utilized as part of the SMDS, it can be deployed as a stand-alone communications system, enabling secure communications between one or more users.

The MICS is a software-based system, and therefore can exist in any environment where a communications system is desired and/or required. For example, MICS software may be stored on a non-transient storage medium or storage device and comprise instructions that provide the MICS functionality as disclosed herein, when executed by a processor (or the like). Communications through the MICS may be facilitated in a point-to-point (person to person) configuration, or in a point-to-multipoint (person to group) type configuration. There are no limitations expressly placed on the communications configurations in which the MICS can operate.

The functional components of the MICS will now be discussed with reference to FIG. 3. Please note that while this configuration illustrates a typical deployment within a system, such as the SMDS, the MICS may be deployed in a variety of systems and configurations where communications between one or more users is desired. It is important to note that while the examples that follow deal largely with text input as the source for communications, the MICS may work with multiple input sources including image files, sound files and other communications sources. These sources may be introduced to the MICS in their binary form.

Figure 3:
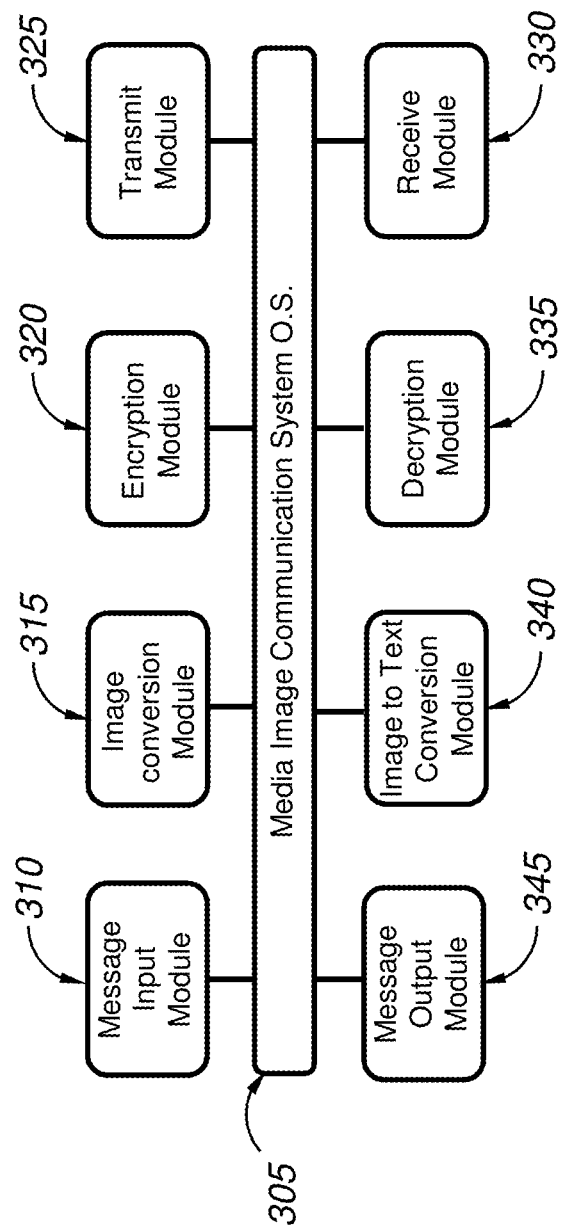
FIG. 3 is a diagram illustrating the primary components of the MICS.

FIG. 3 illustrates the functional software modules and components of the MICS. The control center of the MICS is the operating system 305. The operating system 305 interacts with all of the software components of the MICS to ensure proper routing of command protocol, module interoperability and effective functional operation of the MICS. All system communications between modules is managed through the MICS operating system 305.

The message input module 310 can accept message components (in this example, text) for processing through the MICS. The incoming text message may be generated from any appropriate source, including smart devices such as smartphones and tablets, or personal computing devices. Once the message input is received through the message input module 310, it is passed through the MICS operating system 305 to the image conversion module 315.

The image conversion module 315 takes the contents of the message and converts it into an image file format. The image format may be chosen by the user in the case of a consumer deployment, or may be chosen prior to deployment for implementation within enterprise networks and systems, and may be any of the generally known image file formats, including .tiff; .jpeg; .img; .png and other generally known image file formats.

The encryption module 320 provides the encryption for the message that has been converted into an image. The image will be encrypted utilizing a military-spec compliant encryption algorithm that will prevent unauthorized access and/or tampering with the encrypted image file. The encryption module/process 320 is optional, and may be bypassed based on the privacy and security needs of the user employing the MICS.

The transmit module 325 is responsible for the process of sending a notification to a recipient that a message has been created for them, as well as for ultimately providing the recipient with access to the message being shared. When the user (not shown) sends the message, the transmit module 325 will first send a notification to the intended message recipient, letting them know a message has been created and may now be retrieved. Once the recipient acknowledges the notification, access to the message is provided.

It is important to note that the message being shared is hosted on the senders' device during the notification process. Once the recipient has acknowledged the notification, the recipient may either (a) download and/or take possession of the message, or may (b) view the message as it resides on the host device. The message owner may choose to let the recipient download the message to their device, or may choose to only allow the recipient to view the message. This gives the host of the message ultimate control over the content being shared with the recipient. If the recipient is allowed to download the message, the MICS at the recipient location will unencrypt the message and then convert the image file back to a text file so that it can be both viewed and copied. If the recipient is not allowed to download the message, the MICS at the host location will unencrypt the message and convert the image file back to a text file, providing view-only access to the message contents. If a MICS is not present at the receiving end of the message transmission, all unencrypting will be processed by the host sending the message.

Continuing to refer to FIG. 3, the receive module 330 is designed to receive incoming messages and acknowledgements, and to notify the MICS through the operating system 305 of the presence of a message and/or notification. The receive module 330 will interface with a secondary reception source that is provided and contained within the system hosting the MICS. As an example, a MICS hosted within a smartphone or other personal computing device would receive input that the host device attained through an Internet or other type of communications connection. This input would be ported from the smart device directly to the receive module 330. The configuration of transmit module 325 and receive module 330 would be facilitated at the time the MICS software is installed on a device or system.

Once a message is received through the receive module 330, the operating system 305 will determine if the message is encrypted. If the incoming message is encrypted, the operating system 305 will send the message to the decryption module 335 to be decrypted. The decryption module 335 provides decryption functionality for the MICS, based on the encryption/decryption algorithm programmed into the MICS. The MICS can support multiple currently known types of encryption, and may be configured to utilize proprietary coding schemes.

The image to text conversion module 340 takes an incoming message in the form of an image, and converts that image back to a text format that is both readable and editable. As with the image conversion module 315, the image to text conversion module 340 may receive image files in a variety of configurations including (but not limited to).tiff; .jpg; .png and other image file formats. Once the image to text conversion module 340 has been completed, the text message will be sent through the operating system 305 to the message output module 345.

The message output module 345 will communicate directly with the user device (such as a smartphone, tablet, pc or other) and present the text message to the viewing screen in a format chosen by the user device. A typical format would be a text message in English or other language suited for the communications taking place.

The MICS is not required to be present on all devices for the purpose of sending and receiving text messages. If a device is not MICS-enabled, the image file shared with the recipient from an MICS-enabled device will appear to the non-enabled device as an image file. The image file will be readable, but will not be editable. The encryption process of the message will also be bypassed so that the recipient of the incoming message can view the message without having difficulties. It is important to note that while maximum functionality of the MICS is intended to be used as an end-to-end system to support secure communications between one or more parties, this configuration is not required.

Figure 4:
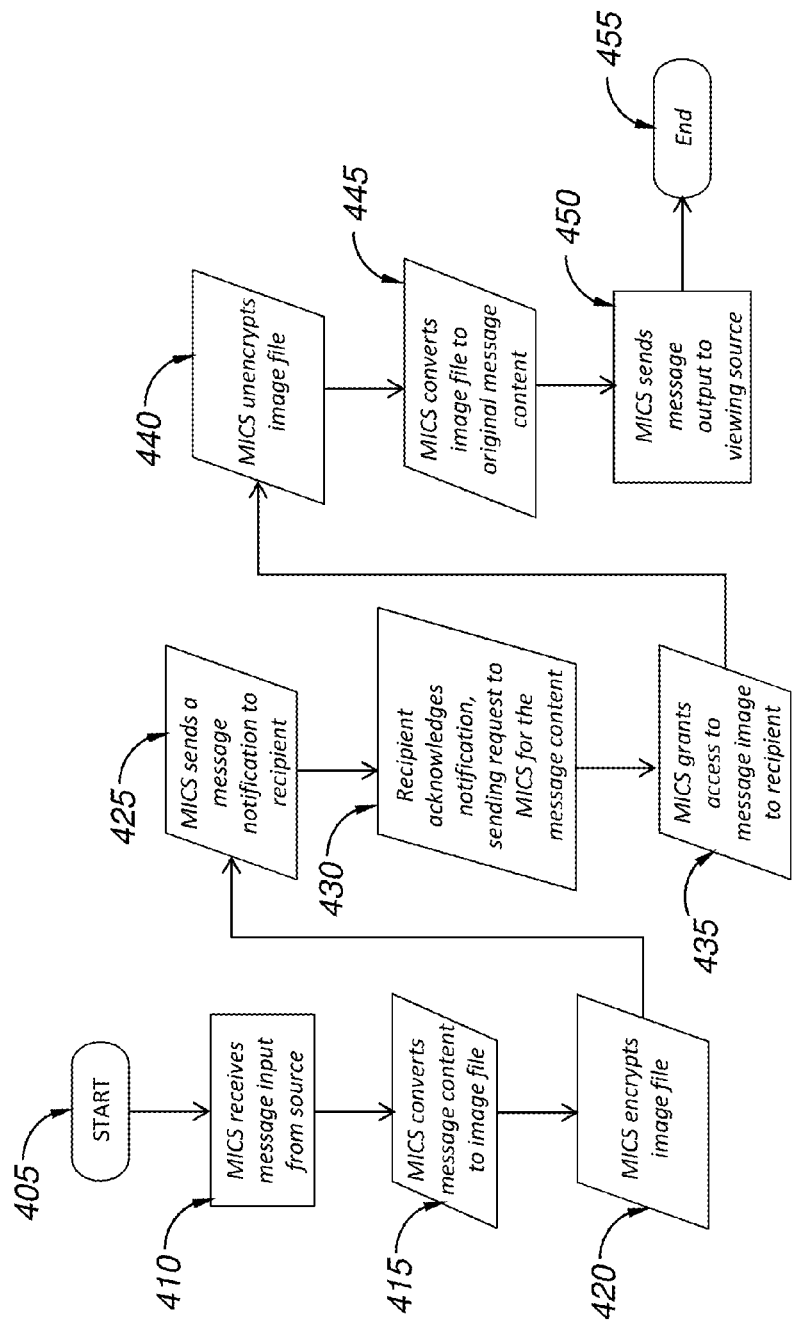
FIG. 4 is a flow diagram illustrating the operational flow of the MICS.

A typical operational flow of the MICS will now be discussed with reference to FIG. 4. Please note that while other operational progressions and functional elements of the MICS exist, FIG. 4 is being presented as both typical and common, and is intended to present a general functionality of the MICS for this discussion. The message input in the following example will be a text message. While the MICS can manage messages in other forms, a text message simplifies the explanation.

Referring to FIG. 4, the MICS functional process starts 405 with the user (not pictured) entering message input into the MICS. The MICS receives the message input 410 from the user (not pictured). The input source being implemented by the user (not pictured) can be any type of communications device such as a smartphone, tablet, pc or other generally known device utilized in peer-to-peer or peer-to-group communications. Once the MICS receives the message input from source 410, the type of input received by the MICS is determined. For the purpose of this example, the input is in text form. Now that the message input type has been determined, the MICS converts the message content to an image file 415. The purpose of the conversion is to prevent the text from being altered or otherwise manipulated prior to arriving at its destination. A secondary purpose for the conversion is to prevent the text message from being intercepted by a party who could potentially be monitoring or otherwise seeking to gain access to the communications taking place. By providing the step of converting the text content to an image file, the text is no longer readable as text, and is no longer editable or traceable as text. The converted file format can be any of the generally known image file formats, including (but not limited to) .tiff; .jpeg; .png and others.

The MICS then takes the image file and optionally provides an encryption process 420 that will encrypt the image file, further removing it from a legible and/or readable format. By providing the optional encryption step, the MICS offers an added layer of protection for the communications being shared by the one or more parties. The MICS can incorporate a number of encryption methodologies including (but not limited to) military-spec encryption, 128-bit encryption, 2-factor authentication and proprietary encryption algorithms.

Now that the message has been converted to an image file 415 and encrypted 420, the MICS sends a notification to the recipient 425 that a message has been created and is pending for the recipient. The purpose of this step is to prevent the message from just being sent, further enhancing the privacy and protection aspects for the message being shared. The message will not be made available to the recipient until the recipient acknowledges the notification 430, which will send a request back to the host MICS for access to the message content. Since the message is being stored on the host MICS, it is not transmitted or otherwise sent to the recipient. Instead, the MICS grants access to the message content 435 to the recipient. The recipient will access the message (via a link providing a physical address to the message) that is being hosted on the MICS host device.

Now that access to the message content 435 has been granted, the host MICS will unencrypt the image file 440. This step is optional and assumes the encryption step 420 has taken place. Once the MICS unencrypts the file 440, the MICS will convert the image file content 445 back to its original form, in this case, a text message. Once the image file has been converted back 445 to a text message, the MICS sends the message output 450 (in the form of text) to a viewing source on the recipient device (not shown). The viewing source is typically a monitor on a pc, a screen on a tablet or smartphone, or other visual screening device. This completes the process 455 of the MICS. It is important to note that the process described with reference to FIG. 4 is repeated when a return message is sent from the recipient back to the message creator (host), when both parties are utilizing the MICS.

The MICS is configured to receive generally known text messages from non-MICS devices. The MICS adds a significant amount of both privacy and security when communicating via text or other type of peer-to-peer, peer-to-group messaging system.

The MICS can be deployed as a stand-alone software application through a commonly known source such as an online retailer for consumer deployment, or may be deployed as a component of a larger system such as an enterprise computing system, cloud storage service or with the Secured Media Distribution System.

As a component of the SMDS, the MICS facilitates communications between the media provider (or host) and the client accessing and utilizing the media through the SMDS. The functional aspects of the SMDS working in conjunction with the MICS will now be discussed with reference to FIG. 5. While reviewing FIG. 5, It is important to note that the SMDS utilizes a MICS at both the media service provider location 505 and the client SMDS 510 device. The media service provider 505 MICS will not be pictured or discussed as the functional aspects explained at the client side SMDS 510 are typical for both the host (media service provider) and client locations. The MICS 535 residing in the client SMDS 510 will be discussed in detail.

Figure 5:
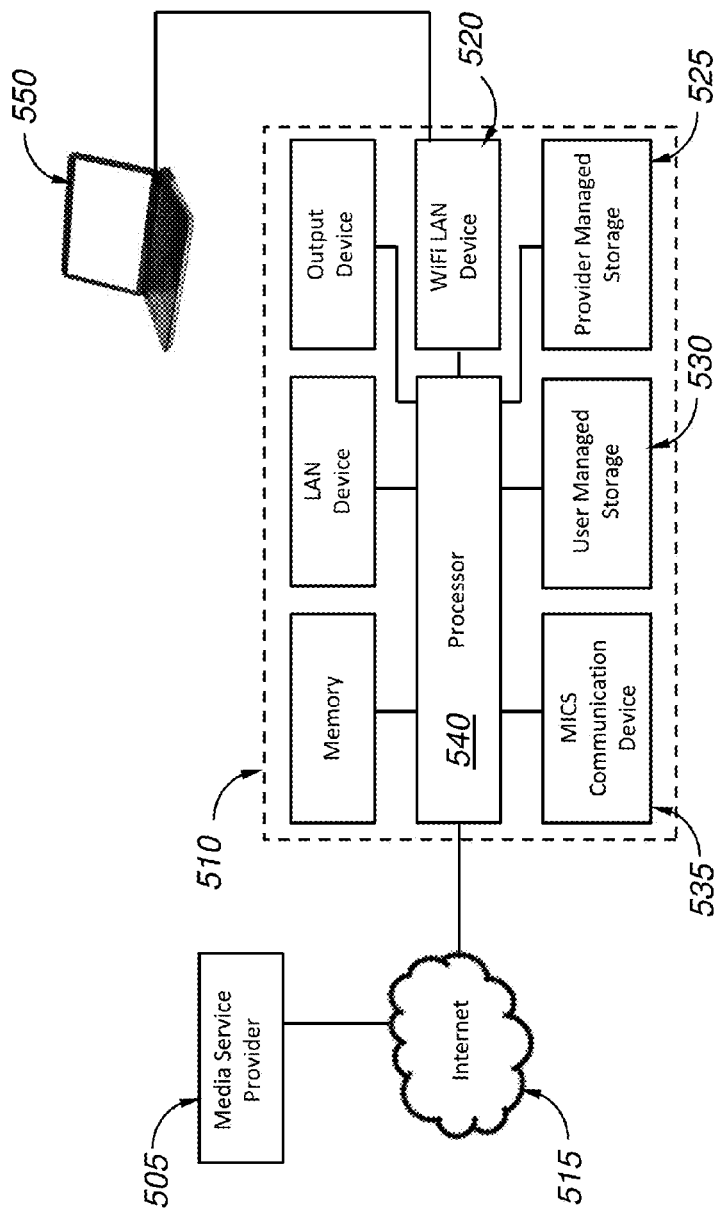
FIG. 5 is a block diagram illustrating the interaction of functional components of the SMDS during a communications session between a media service provider and a client/user of the SMDS system.

As can be seen in FIG. 5, the SMDS 510 is connected to a media service provider 505 through an internet connection 515. The processor 540 works in conjunction with SMDS operating system (not pictured) to route SMDS 510 traffic to the appropriate module within the SMDS 510 system. The MICS communication device 535 handles all the messaging that occurs between the SMDS 510 and the media service provider 505.

In one exemplary example of the MICS functionality, a media service provider 505 sends a message to the client SMDS 510. The processor 540 will work in conjunction with the SMDS operating system (not pictured) to route the message to the MICS communication device 535 within the SMDS 510. As previously explained in FIG. 3, the message being sent to the MICS communication device 535 will be in the form of an image type file. If the file being sent from the media service provider 505 is encrypted, the MICS communication device 535 receiving the image file will apply the appropriate decryption algorithm (depending on the chosen encryption method for the system) and convert the image file back to its decrypted image file form. The MICS communication device 535 will then convert the resulting image file into its original text message form. Once the conversion is completed, the MICS communication device 535 will utilize the processor 540 and the SMDS operating system (not pictured) to send the message through the SMDS 510 to the wifi LAN device 520. The wifi LAN device 520 will present the message to a viewing device such as a laptop computer 550. The output device 550 can be any device selected by the client/user of the SMDS system.

If the media service provider 505 has chosen to give the client SMDS 510 permission to take ownership of the message being sent, the client SMDS 510 will be given the option to download and store a copy of the message. If so, the client SMDS 510 can choose to store the message on the user managed storage 530, or it can simply choose to delete the message. In a similar fashion, the media service provider 505 can choose to host a copy of their message to the client SMDS 510 on the provider managed storage 525 for retransmission in the future, or can store it at the media service provider 505 host location.

In one embodiment, the option to download and store (i.e., own) a copy of the message may be available once a client SMDS 510 acknowledges the notification that a message has been created and is pending, as described above with regard to FIG. 4. Alternatively or in addition, a client SMDS 510 may pay for the option to download and store a copy of the message. Once payment or other criteria have been met, the client SMDS 510 may be given the option to download and store a copy of the message. Once the option to download and store a message is available to a client SMDS 510, the message may be moved (automatically or upon a client request) from provider managed storage 525 to user managed storage 530.

If the media service provider 505 has elected not to give the client SMDS 510 permission to take ownership of the message being sent, the client SMDS 510 will produce the message through the MICS 535 as described previously, and present the message through the wifi LAN device 520 to the client device 550 in a read-only fashion. This read-only message may not be altered, stored or otherwise edited or changed in any way. In either functional aspect of read-only or full download permission, the client 550 will be given the opportunity to respond to the message.

As we continue to reference FIG. 5, we will now discuss the reply or response message from the client SMDS 510 to the media service provider 505. The response process begins by the client 550 device receiving the message input from the client (not pictured). Once the message input has been created in the client 550 device, the message will be sent from the wifi LAN device 520, through the processor 540 to the MICS communication device 535. The MICS communications device 535 will convert the message input to an image file, and apply the specified encryption coding to the message, as selected by the client 550 device. Once the message is packaged by the MICS communication device 535, it will engage the processor 540 and the operating system (not pictured) to send a message response over the internet 515 to the media service provider 505. Ideally, the MICS is provisioned to allow the user of the SMDS 510 to configure protection of the message such as download enabled or read-only access, requiring the media service provider 505 to receive the message in the manner indicated by the user of the SMDS 510. However, depending on the deployment and provisioning of the SMDS by the media service provider 505, this capability may be disabled. In cases where the permission controls are disabled by the media service provider 505, they will always receive incoming messages from client SMDS 510 devices with the download feature enabled (by default). This ensures the media service provider 505 can always take ownership of, and/or download the message being received from the client SMDS 510 device.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A media image communication system comprising: one or more first storage devices having at least one provider managed portion; one or more second storage devices having at least one user managed portion, wherein a recipient may download and store data from the at least one user managed portion but not from the provider managed portion; and a non-transitory storage medium storing instructions that, when executed, cause one or more processors to: receive one or more text messages from a user; convert the one or more text messages into one or more image files comprising a visual representation of the one or more text messages, wherein the visual representation is visible as an image in the one or more images files; send a notification to a recipient; convert the one or more image files into text using the visual representation in the one or more image files when an acknowledgment to the notification is received; and store the text in the provider managed portion; wherein the instructions also cause the one or more processors to move the text from the at least one provider managed portion to the at least one user managed portion after the acknowledgment is received; and wherein the instructions also cause the one or more processors to move the text from the at least one provider managed portion to the at least one user managed portion when an option to download or store the text becomes available to the user.

2. The media image communication system of claim 1, wherein the instructions also cause the one or more processors to store the one or more image files on the at least one provider managed portion.

3. The media image communication system of claim 1, wherein the instructions also cause the one or more processors to encrypt the one or more image files.

4. The media image communication system of claim 1, wherein the instructions also cause the one or more processors to transmit the text to the recipient.

5. The media image communication system of claim 1, wherein the instructions also cause the one or more processors to transmit a link to the recipient that identifies a location at which the text can be downloaded.

6. A non-transitory storage medium comprising instructions that, when executed, cause one or more processors to: receive one or more text messages from a user; convert the one or more text messages into one or more image files, wherein the one or more image files include a visual representation of the one or more text messages, wherein the visual representation is visible as an image in the one or more image files; send a notification to a recipient that a message is pending; receive an acknowledgment of the notification; after receipt of the acknowledgment, convert the one or more image files into text based on the visual representation of the one or more text messages in the one or more image files; and store the text on a first storage device; wherein the instructions cause the one or more processors to move the text from the first storage device to a second storage device after receipt of the acknowledgment.

7. The non-transitory storage medium of claim 6, wherein the instructions cause the one or more processors to transmit the text to the recipient.

8. The non-transitory storage medium of claim 6, wherein the instructions cause the one or more processors to encrypt the one or more image files.

9. The non-transitory storage medium of claim 6, wherein the instructions cause the one or more processors to store the one or more image files on the first storage device.

10. The non-transitory storage medium of claim 6, wherein the instructions cause the one or more processors to verify that the one or more text messages contain valid text-based information.

11. The non-transitory storage medium of claim 6, wherein the text is stored in a read-only fashion on the first storage device.

12. A method for communicating through one or more images comprising: receiving a message from a user; determining if the message is a text message with one or more processors; if the message is a text message, converting the message into an image file comprising a visual representation of the text message and storing the image file on one or more first storage devices, wherein the visual representation is visible as an image in the image file; transmitting a notification to a recipient after the image file is created via one or more communication devices; after receiving an acknowledgment of the notification from the recipient, converting the image file into text based on the visual representation of the text message therein; displaying the text to the recipient via a display device; and moving the text from the one or more first storage devices to one or more second storage devices after receipt of the acknowledgment.

13. The method of claim 12 further comprising encrypting the image file.

14. The method of claim 12 further comprising transmitting the text to the display device.

15. The method of claim 12, wherein the image file is stored in a read only fashion on the one or more first storage devices.

16. The method of claim 12 further comprising storing the text on the one or more first storage devices.

\* \* \* \* \*